(12) United States Patent
Denzel et al.

(10) Patent No.: US 6,729,036 B2
(45) Date of Patent: May 4, 2004

(54) MEASURING APPARATUS

(76) Inventors: Johannes Markus Denzel, Th.-Hanloser-Strasse 12, 78224 Singen (DE); Heiuvich Bercher, Garteustr. 3a, D 78462 Konstanz (DE)

( * ) Notice: Subject to any disclaimer, the term of this patent is extended or adjusted under 35 U.S.C. 154(b) by 0 days.

(21) Appl. No.: 10/171,061

(22) Filed: Jun. 12, 2002

(65) Prior Publication Data

US 2002/0189123 A1 Dec. 19, 2002

(30) Foreign Application Priority Data

Jun. 13, 2001 (DE) .......................................... 101 29 819

(51) Int. Cl.$^7$ ................................................. G01B 7/14
(52) U.S. Cl. ....................... 33/706; 33/708; 33/DIG. 15
(58) Field of Search ..................... 33/706, 707, 708, 33/DIG. 1, DIG. 15

(56) References Cited

U.S. PATENT DOCUMENTS

| | | | | |
|---|---|---|---|---|
| RE35,084 E | * | 11/1995 | Lorenz ........................ | 33/706 |
| 5,489,845 A | | 2/1996 | Weber et al. .......... | 324/207.25 |
| 5,545,985 A | * | 8/1996 | Campbell ............... | 324/207.21 |
| 5,930,905 A | * | 8/1999 | Zabler et al. ................ | 33/1 PT |
| 6,018,881 A | * | 2/2000 | Spies ........................... | 33/706 |
| 6,029,363 A | * | 2/2000 | Masreliez et al. ............ | 33/706 |
| 6,438,860 B1 | * | 8/2002 | Glimm ........................ | 33/707 |
| 6,550,150 B1 | * | 4/2003 | Kenjo et al. ................. | 33/708 |
| 6,658,747 B2 | * | 12/2003 | Kuru ........................... | 33/708 |

FOREIGN PATENT DOCUMENTS

| | | |
|---|---|---|
| DE | 3244891 | 6/1984 |
| DE | 3443176 | 12/1985 |

* cited by examiner

*Primary Examiner*—G. Bradley Bennett
*Assistant Examiner*—Madeline Gonzalez
(74) *Attorney, Agent, or Firm*—Pandiscio & Pandiscio

(57) ABSTRACT

In a measuring apparatus (1) for contactlessly determining the position of two components (11 and 12 respectively) which are displaceable relative to each other and which are in the form of a measurement value sender (11) and a sensor (21) co-operating therewith, the measurement value sender (11) is in the form of a switching ring comprising a metallic material and connected to the displaceable component, and the sensor (21) comprises a plurality of inductive measuring heads which are arranged over the displacement range of the switching ring and which produce an electromagnetic measuring field composed of individual fields. The measuring heads are also connected to a computing unit (25) in which there is stored in a memory the signal configuration ascertained upon calibration of the measuring apparatus (1); the position of the displaceable component can be determined after a displacement movement of the switching ring (12), by comparison of the signals produced, with the stored signal configuration.

Figure 1:
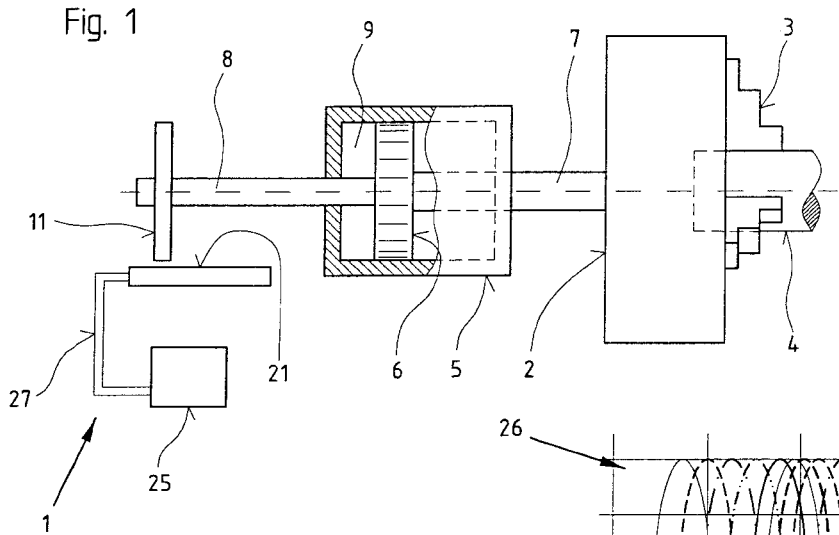

This design configuration provides that incorrect measurements are reliably avoided and that a magnetic and a mechanical shock do not have to be tolerated as the measuring apparatus (1) is operational without magnets.

11 Claims, 3 Drawing Sheets

MEASURING APPARATUS

The invention relates to a measuring apparatus for contactlessly determining the position of two components which are displaceable relative to each other with a translatory movement, in particular for determining the position of a displacement piston which is fitted in a cylinder and which is drivingly connected to clamping jaws of a power-operated chuck, wherein the one component is in the form of a measurement value sender and the other component is in the form of a sensor co-operating therewith, the sensor comprises a plurality of measuring heads which are arranged over the displacement range of the measurement value sender and which are connected to a computing unit which has an evaluation circuit and in which there is stored in a memory the signal configuration of the individual measuring heads, which is ascertained upon calibration of the measuring apparatus in dependence on the position of the measurement value sender, and the position of the displaceable component can be determined after an axial displacement movement of the measurement value sender by comparison of the signals respectively produced thereby in the measurement field with the stored signal configuration.

An electronic position detector of that kind is known from DE 32 44 891 A1. In that arrangement the sensor comprises a plurality of coils which are disposed on different ferrite members as carriers in the same mechanical arrangement with a defined spacing and which co-operate with a measurement value sender which is also in the form of a coil. If a voltage pulse or an ac voltage is applied to the individual coils in succession or at the same time, the signals in the individual coils differ, depending on the position in which the measurement value sender is disposed, as a position indicator, relative to one of the oppositely disposed coils. If the individual coils are interrogated for example by means of an electronic multiplexer, the different signal inputs are directly a measurement in respect of the position of the measurement value sender.

Feed lines to the displaceable measurement value sender are admittedly avoided, but in many cases measurement inaccuracies have to be tolerated as the magnetic fields of the coils forming the sensor overlap and thus in many situations a precise association of the measurement value sender is not possible.

Accordingly, the object of the invention is to provide a measuring apparatus for contactlessly determining the position of two components which are displaceable relative to each other with a translatory movement, which not only can be produced in an extremely economical fashion but with which incorrect measurements are reliably also avoided. The invention seeks to provide that in this case a magnetic shock as well as external influences which can result in measurement inaccuracies do not have to be tolerated; on the contrary the invention seeks to provide that the measuring apparatus is operational with an associated consumer so that precise determination of the respective axial position of the component to be monitored is made possible in a very simple fashion.

In the measuring apparatus designed in accordance with the invention for contactiessly determining the position of two components which are displaceable relative to each other with a translatory movement, that is attained in that the measurement value sender is in the form of a switching ring and comprises a metallic, preferably ferromagnetic material, and that the switching ring is provided on the end face towards the sensor with a profiling formed by at least one recess machined therein.

In this case, the flanks of the recess can be perpendicular to the axis or of a trapezoidal shape extending inclinedly outwardly or inwardly relative to the face of the switching ring or can be of a convexly or concavely curved configuration, in which respect it is appropriate for two recesses which are arranged at a lateral spacing from each other to be formed in the face of the switching ring.

In the case of a switching ring with recesses which are incorporated in the face thereof perpendicularly to the axis, in relation to the face thereof, it is desirable for the recesses and the projections formed thereby to be of the same width.

The lateral spacing of the measuring heads can be different in relation to the lateral spacing of two flanks of two projections, which are directed in the same direction. In accordance with a preferred configuration the spacing of the measuring heads in relation to the spacing of the flanks should be in a ratio of three to four.

The measuring heads should be arranged equidistantly over the displacement range of the switching ring, preferably in a line. The measuring heads which produce an electromagnetic measuring field composed of individual fields can each also be formed from a ferrite shell core and a coil pack.

If a measuring apparatus is designed in accordance with the invention, it is possible to ascertain the respective position of the component which is displaceable with a translatory movement, without involving a high level of structural complication and expenditure. More specifically, along the measuring distance, an electromagnetic measuring field composed of the respective individual fields is produced by the inductive measuring heads which can comprise ferrite shell cores with for example on average 3.3 mm for inductive proximity switches and a coil pack on copper enamel wire of 0.028 mm with twice 170 windings. When the switching ring is in the working region of the measuring heads, they are influenced by way of the action of the switching ring on the associated electromagnetic individual fields. When dealing with ferromagnetic or electrically conductive object materials, that results in a variation in the inductance of the measuring head and also eddy current losses, in which respect basically the two effects act in opposition. When dealing with non-ferromagnetic object materials in contrast, only eddy current losses occur. Those effects can be measured with circuits which are suitable for that purpose. Taking the actual attenuation profile of the individual measuring heads, using an evaluation algorithm, it is possible to calculate the current axial position of the switching ring, more specifically independently of the angle of rotation and within certain limits of the radial spacing between the switching ring and the measuring head.

The face of the switching ring which is manufactured from a commercially available steel is desirably to be profiled in such a way that the surface thereof forms three projections. They produce an increase in the level of measuring accuracy as more signal edges are produced for evaluation, per unit of length. That increase is used in order to minimise the number of measuring heads and to be able to make the spacing thereof relative to each other as large as possible. In that way on the one hand the measuring system becomes less expensive, while on the other hand this avoids mutual influencing the measuring heads.

In practice however it is not possible to achieve an ideal triangular signal configuration as inter alia the maxima and the minima markedly flatten off. Signals with a horizontal or a vertical configuration are unsuitable for evaluation as they do not contain clear travel information. There are however always two measuring signals between y=0.25 and y=0.75, accordingly in a region in which a linear rise can in practice also be produced. With the respectively largest individual signal y>0.75 it is thus possible to calculate a plurality of possible coarse positions and with the second and third largest signal (0.25<y<0.75), by virtue of linear interpolation and signal linking, it is possible to calculate the definitive clear position, having regard to the coarse position.

The signals produced by the individual measuring heads can be processed by a standardisation procedure in such a way that common-mode disturbances which act on all measuring heads are almost completely eliminated. Such disturbances include inter alia fluctuations in temperature, changes in the properties of the steel of the switching ring under the influence of temperature or centrifugal force, ageing and temperature drift in the analog electronics and a variation in the spacing from the switching ring to the measuring heads.

Thus, a comparison of the pre-processed signal configurations with the signal configurations which are stored in a memory and which were ascertained upon calibration of the measuring apparatus makes it easily possible to determine the respective position of the component which is displaceable with a translatory movement, namely the switching ring, and accordingly, in dependence thereon, also the position of the clamping piston whose position changes upon a loss in clamping force. In that respect it is immaterial whether the component which is displaceable with a translatory or linear movement performs only such a movement or in that respect also rotates. A rotational movement has no influence on the signal configuration. The clamping force of a power-operated chuck is accordingly to be easily monitored by way of a change in position of the displacement piston which acts on the clamping jaws thereof.

Figure 2:
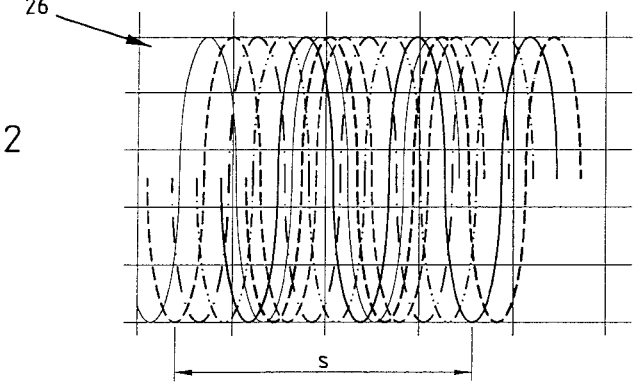
Figure 3:
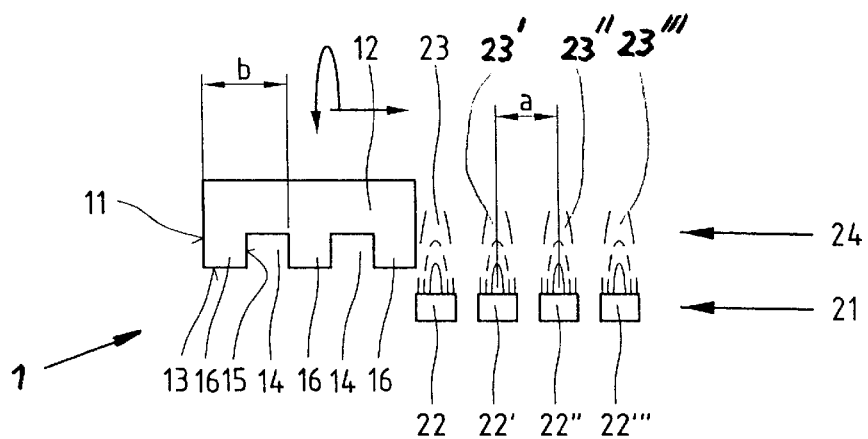
Figure 4:
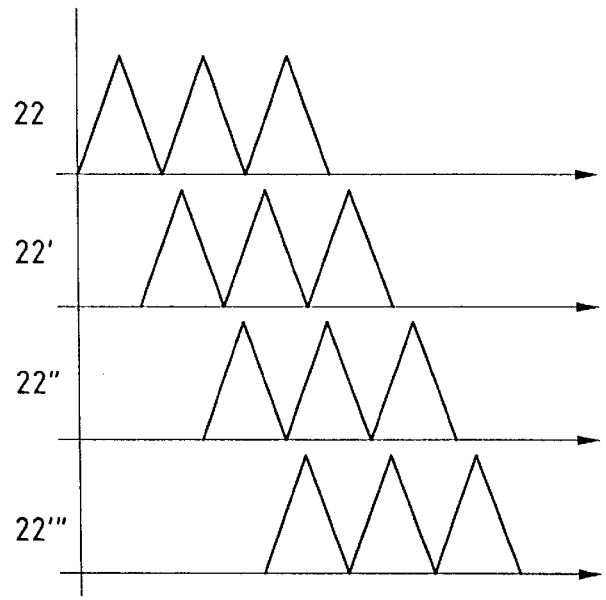
Figure 5:
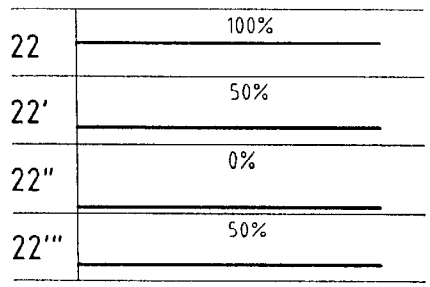
Figure 6:
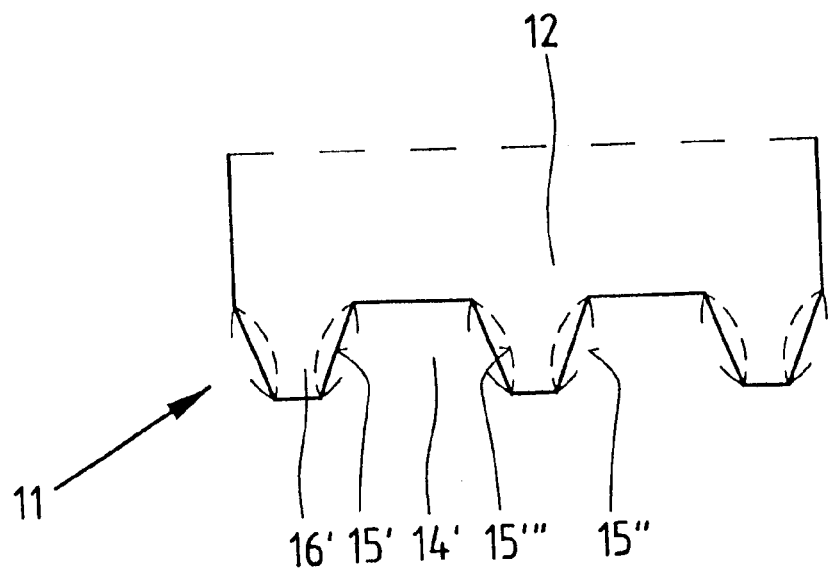

An embodiment of a measuring apparatus designed in accordance with the invention is described in detail hereinafter and illustrated in the drawing in which:

FIG. 1 is a diagrammatic view of the measuring apparatus associated with a power-operated chuck, FIG. 2 shows the signal configuration of the measuring heads forming the sensor, which is ascertained upon calibration of the measuring apparatus shown in FIG. 1, FIG. 3 shows the measuring apparatus of FIG. 1 before it is brought into operation, FIG. 4 shows a signal diagram of the measuring heads, which is produced by the projections of the switching ring, FIG. 5 shows the status diagram of individual sensors in an operating position, and FIG. 6 shows a view on an enlarged scale of a switching ring with flanks of a different configuration.

The measuring apparatus shown in FIGS. 1 and 3 and identified by reference numeral 1 serves for contactlessly determining the position of two components which are displaceable relative to each other with a translatory movement, in the illustrated embodiment for determining the position of a displacement piston 6 which is fitted in a cylinder 5 and which can be acted upon by a pressure fluid fed into a pressure chamber 9 and which is drivingly connected by way of a piston rod 7 to the clamping jaws 3 of a power-operated chuck 2. It is possible in that way to monitor the clamping force which is applied to a workpiece 4 fitted between the clamping jaws 3 of the power-operated chuck 2, as the axial position of the displacement piston 6 changes upon a drop in pressure in the pressure chamber 9 of the cylinder 5.

In this case the measuring apparatus comprises a measurement value sender 11 which is positively connected to the displacement piston 6 by way of a rod 8 and which is in the form of a switching ring 12 comprising a metallic material, and a sensor 21 which, as shown in FIG. 3, is composed of individual measuring heads 22, 22', 22", 22"', . . . . The measuring heads 22, 22', 22", 22"'. . . are arranged equidistantly in a line over the displacement range s of the switching ring 12 and, as they are respectively formed from a ferrite shell core and a coil pack, produce an electromagnetic field 24 composed of individual fields 23, 23', 23". . . .

As can be seen in particular from FIG. 3 the switching ring 12 is provided on the face towards the sensor 21 with a profiling 13 insofar as two recesses 14 are machined therein so that three projections 16 have remained. In this embodiment the flanks of the recesses 14 extend perpendicularly to the face of the switching ring 12, and in addition the recesses 14 and the projections 16 are of the same width.

The individual inductive measuring heads 22, 22', 22", 22"'. . . which are arranged so as to be distributed uniformly over the displacement range s of the switching ring 12, are provided in a line at a spacing a relative to each other which is in a ratio of three to four, in relation to the spacing of two flanks 15 of the switching ring, which are directed in the same direction. In that way the level of measuring accuracy is increased, in a similar manner to a vernier scale of slide gauges, as more signal edges per unit of length are produced for evaluation purposes. In that way the number of measuring heads 22, 22', 22", 22"'. . . can be kept down and the spacing thereof relative to each other can be kept large. Mutual influencing of the measuring heads is also virtually avoided.

The flanks 15', 15" and 15"' respectively of the projections 16 defining the recesses 14' however, as shown In FIG. 6, can also be inclined inwardly in a trapezoidal configuration or can be of a convexly or concavely curved configuration.

FIG. 2 shows a real signal configuration 26 of the individual measuring heads 22, 22', 22", 22"'. . . , which is ascertained upon calibration of the measuring apparatus 1 in dependence on the respective position of the switching ring 12, and stored in a memory of a computing unit 25 which is connected by way of a line 27 to the individual measuring heads 22, 22', 22", 22"'. . . .

In order to ascertain the actual position of the displacement piston 6, only the respectively produced signals are compared together with the realistically stored signal configuration 26 by means of the computing unit 25, in order in that fashion to determine the position of the switching ring 12. As a change in the signals is already produced upon just a minor change in the position of the displacement piston 6, precise monitoring of the clamping force acting on the clamping jaws 3 of the power-operated chuck 2 can be implemented, without involving a high level of manufacturing complication and expenditure. In that respect it is immaterial whether the switching ring 12, in the translatory displacement movement, only performs that movement or also rotates.

FIG. 4 shows the signal diagram of the measuring heads 22, 22', 22" and 22"', which is produced by the projections 16 of the switching ring 12 when passing over the measuring heads 22, 22', 22" and 22"'. FIG. 5 shows the attenuation diagram for the measuring heads 22, 22', 22" and 22"', with the respective degree of attenuation.

What is claimed is:

1. A measuring apparatus (1) for contactlessly determining the position of a displacement piston (6) fitted in a cylinder (5) and drivingly connected to clamping jaws (3) of a power-operated chuck (2), the apparatus comprising a measurement value sender (11) moveable with said piston and a sensor (21) co-operating therewith, the sensor (21) comprising a plurality of inductive measuring heads (22, 22', 22", 22'''. . . ) arranged over a displacement range of the measurement value sender (11), the measuring heads (22, 22', 22", 22'''. . . ) being connected to a computing unit (25) which has an evaluation circuit and in which there is stored in a memory a signal configuration (26) of the individual measuring heads (22, 22', 22", 22'''. . . ), wherein position of the piston is determined after an axial displacement movement of the piston and said measurement value sender (11) by comparison of signals respectively produced thereby in a measuring field (24) with the stored signal configuration (26), wherein said measurement value sender (11) comprises a switching ring (12) of a metallic material, and is provided on a peripheral surface which is proximate said sensor (21), with a profiling (13) formed by at least one recess (14) provided therein.

2. A measuring apparatus as set forth in claim 1 wherein flanks (15, 15', 15", 15''') of recesses (14, 14") are transverse to an axis of the switching ring (12) and are of a curved configuration.

3. A measuring apparatus as set forth in claim 2 wherein the recesses (14) and projections (16) formed thereby are of equal width.

4. A measuring apparatus as set forth in claim 3 wherein lateral spacing (a) of the measuring heads (22, 22', 22", 22'''. . . ) is different from lateral spacing (b) of two of the flanks (15), which are directed in the same direction as two of the projections (16).

5. A measuring apparatus as set forth in claim 4 wherein the spacing (a) of the measuring heads (22, 22', 22", 22'''. . . ) is in a ratio to the spacing (b) of the flanks (15) of three to four.

6. A measuring apparatus as set forth in claim 1 wherein two recesses (14, 14') are arranged at a lateral spacing relative to each other in the peripheral surface of the switching ring (12).

7. A measuring apparatus as set forth in claim 1 wherein the measuring heads (22, 22', 22", 22'''. . . ) are arranged equidistantly in a line over the displacement range of the switching ring (12).

8. A measuring apparatus as set forth in claim 1 wherein the measuring heads (22, 22', 22", 22'''. . . ) are respectively formed from a ferrite shell core and a coil pack.

9. A measuring apparatus as set forth in claim 1 wherein the measuring heads (22, 22', 22", 22'''. . . ) produce an electromagnetic field (24) comprising a plurality of individual fields of (23, 23', 23", 23'''. . . ).

10. The measuring apparatus in accordance with claim 1 wherein said switching ring is provided with the profiling on a whole of the peripheral surface, such that interaction of said switching ring and said sensor continue upon rotational movement of said switching ring.

11. A measuring apparatus for contactlessly determining a position of a displacement piston, the apparatus comprising:

a measurement value sender moveable with the piston, and a sensor for co-operation with said measurement value sender, said sensor comprising a plurality of inductive measuring heads arranged over a displacement range of the measurement value sender, the measuring heads being connected to a computer unit having an evaluation circuit and in which there is stored in a memory a signal configuration of the individual measuring heads;

wherein a position of the piston is determined after an axial displacement movement of the piston and said measurement value sender by comparison of signals respectively produced thereby in a measuring field with the stored signal configuration;

wherein said measurement value sender comprises a ring of a metallic material and is provided on a peripheral surface thereof, which is proximate said sensor, with a profiling formed by at least one recess provided therein; and wherein the measuring heads produce an electromagnetic field comprising a plurality of individual fields.

* * * * *